(12) United States Patent
Marianowski et al.

(10) Patent No.: US 6,905,793 B2
(45) Date of Patent: Jun. 14, 2005

(54) FOLDED METAL BIPOLAR SHEETS FOR FUEL CELLS

(75) Inventors: Leonard G. Marianowski, Mount Prospect, IL (US); Gerald J. Koncar, McHenry, IL (US); Qinbai Fan, Chicago, IL (US); Jeremy Chervinko, Streamwood, IL (US)

(73) Assignee: Gas Technology Institute, Des Plaines, IL (US)

( * ) Notice: Subject to any disclaimer, the term of this patent is extended or adjusted under 35 U.S.C. 154(b) by 220 days.

(21) Appl. No.: 10/429,457

(22) Filed: May 5, 2003

(65) Prior Publication Data

US 2004/0224205 A1 Nov. 11, 2004

(51) Int. Cl.[7] .................................................. H01M 2/00
(52) U.S. Cl. ............................ 429/35; 429/34; 429/36
(58) Field of Search .............................. 429/34, 35, 36, 429/38, 26

(56) References Cited

U.S. PATENT DOCUMENTS

| 5,776,624 A | 7/1998 | Neutzler |
| 6,261,710 B1 * | 7/2001 | Marianowski ............... 429/34 |

* cited by examiner

*Primary Examiner*—Michael Barr
*Assistant Examiner*—Monique Wills
(74) *Attorney, Agent, or Firm*—Mark E. Fejer

(57) ABSTRACT

In a fuel cell stack, a bipolar separator plate having two joined together coextensive separator plate elements having perpendicularly disposed corrugated regions and forming a coolant chamber there between. By virtue of this arrangement, fuel and oxidant gases fed to the fuel cell stack have a cross-flow relationship. Internal stack manifolding is provided for distribution of a coolant to each of the coolant chambers.

14 Claims, 5 Drawing Sheets

FOLDED METAL BIPOLAR SHEETS FOR FUEL CELLS

BACKGROUND OF THE INVENTION

1. Field of the Invention

This invention relates generally to bipolar separator plates for use in connection with substantially planar electrochemical fuel cell units for generating electricity, and fuel cell stacks comprising such fuel cell units. More particularly, this invention relates to gas (e.g. air) and/or liquid cooled, bipolar sheet metal separator plates for use in polymer electrolyte membrane fuel cells. Although the concept of this invention may be applied to bipolar separator plates for a variety of fuel cell types and designs, including molten carbonate and solid oxide fuel cells, it is particularly suitable for use in polymer electrolyte membrane fuel cell stacks in which the fuel and oxidant are provided to each of the fuel cell units comprising the fuel cell stack through external manifolds.

2. Description of Related Art

Fuel cells are electrochemical devices that convert chemical energy of a reaction directly into electrical energy. The basic fuel cell unit comprises an anode electrode, a cathode electrode and an electrolyte disposed between the two electrodes, to which a fuel, such as hydrogen is continuously provided to the anode (negative) electrode and oxidant, such as an oxygen-containing gas, is provided to the cathode (positive) electrode, whereby electrochemical reactions occur at the electrodes to produce an electrical current.

There are a number of fuel cell systems currently in existence and/or under development which have been designed and are proposed for use in a variety of applications including power generation, automobiles, and other applications where environmental pollution is to be avoided. These include molten carbonate fuel cells, solid oxide fuel cells, phosphoric acid fuel cells, and polymer electrolyte membrane fuel cells. One issue associated with successful operation of each of these fuel cell types is the control of fuel cell temperature and the removal of products generated by the electrochemical reactions from within the fuel cell.

Polymer electrolyte membrane fuel cells, which are well known in the art, are particularly advantageous because they are capable of providing potentially high energy output while possessing both low weight and low volume. Each such fuel cell typically comprises a "membrane-electrode-assembly" comprising a thin, proton-conductive, polymer membrane-electrolyte having an anode electrode film formed on one face thereof and a cathode electrode film formed on the opposite face thereof, although separate electrode and electrolyte layers may be employed in place of the membrane-electrode-assembly. In general, such membrane-electrolytes are made from ion exchange resins, and typically comprise a perflourinated sulfonic acid polymer such as NAFION™ available from E. I. DuPont DeNemours & Co. The anode and cathode films typically comprise finely divided carbon particles, very finely divided catalytic particles supported on the internal and external surfaces of the carbon particles, and proton-conductive material intermingled with the catalytic and carbon particles, or catalytic particles dispersed throughout a polytetrafluoroethylene (PTFE) binder.

Commercially viable fuel cell stacks may contain several hundred individual fuel cells (or fuel cell units), each having a planar area up to several square feet, depending upon the type of fuel cell. Fuel cell stacks containing a plurality of fuel cell units may be up to several feet tall, presenting serious problems with respect to maintaining cell integrity during heat-up and operation of the fuel cell stack. Due to thermal gradients between the cell assembly and cell operating conditions, differential thermal expansions, and the necessary strength of materials required for the various components, close tolerances and very difficult engineering problems are presented. In this regard, cell temperature control is highly significant and, if it is not accomplished with a minimum temperature gradient, uniform current density will not be maintainable, and degradation of the cell will occur.

In a fuel cell stack, a plurality of fuel cell units are stacked together in electrical series, separated between the anode electrode of one fuel cell unit and the cathode electrode of an adjacent fuel cell unit by an impermeable, electrically conductive, bipolar separator plate which provides reactant gas distribution on both external faces thereof, which conducts electrical current between the anode of one cell and the cathode of the adjacent cell in the stack, and which, in most cases, includes internal passages therein which are defined by internal heat exchange faces and through which coolant flows to remove heat from the stack. Such a bipolar separator plate is taught, for example, by U.S. Pat. No. 5,776,624. In such fuel cell stacks, the fuel is introduced between one face of the separator plate and the anode side of the electrolyte and oxidant is introduced between the other face of the separator plate and the cathode side of a second electrolyte. The fuel and oxidant can be fed to the fuel cell stack by means of internal gas manifolding, external gas manifolding, or a combination thereof.

Conventional bipolar separator plates for use in fuel cell stacks are typically molded or machined from graphite/carbon composites, electrochemically etched from plates or press formed from thin sheets of metal. The materials and fabrication processes employed depend upon the type of fuel cell. Carbon composites and metals can be used for fuel cells operating below about 200° C. while only metals are typically suitable for use above about 200° C. However, press forming of sheet metal requires costly die molds and requires that the metal have an elongation of greater than about 50%, which severely limits the metals available for use in the corrosive environments of polymer electrolyte membrane fuel cells or the high temperature environments of molten carbonate fuel cells and solid oxide fuel cells. In addition, press forming of thin sheets of metal to produce bipolar separator plates disadvantageously results in plates having stresses which must be relieved, typically by high temperature annealing, prior to use. Furthermore, depending upon the plate design, press forming results in a plate in which some portions of the formed metal are thinner than other portions due to metal thinning. This is particularly true with respect to plates comprising corrugated regions where the metal forming the peaks/valleys of the corrugations is thinner than the metal disposed between the peaks and valleys. As a result, for a given metal sheet thickness, the heights of the peaks as well as the distances between the peaks, hereinafter sometimes referred to as "pitch," are significantly limited. Typically, the depth of the valley is generally limited to less than about ½ the peak-to-peak distance.

As previously suggested, it is essential that the bipolar separator plates provide good electrical contact with the electrodes which sandwich the electrolyte. It is also essential that the feed gases (fuel and oxidant) pass over their respective electrodes in a uniform manner with as low a pressure drop as possible between the inlet and the outlet. These two requirements mean that frequent bipolar separator plate contact with the electrodes is necessary to minimize contact resistance. At the same time, this contact should mask off the minimum amount of electrode so that easy gas access to the electrodes is maintained for maximum electrochemical performance.

SUMMARY OF THE INVENTION

Accordingly, it is one object of this invention to provide a sheet metal bipolar separator plate which addresses the dimensional limitations of bipolar separator plates formed by pressing of sheet metal.

It is one object of this invention to provide a sheet metal bipolar separator plate which addresses the issue of stress relief prior to use required of conventionally formed separator plates.

It is another object of this invention to provide sheet metal bipolar separator plates in which the possible combinations of peak-to-peak distances and valley depths are substantially greater than for plates produced by conventional means.

It is yet another object of this invention to provide a bipolar separator plate in which the sheet metal forming the plate is of substantially uniform thickness.

These and other objects of this invention are addressed by a separator plate comprising two joined together coextensive separator plate elements having perpendicularly disposed corrugated regions and forming a coolant chamber there between, each of the separator plate elements having an electrode facing face and a coolant facing face. Two flattened peripheral seal regions extend along opposed edges of each of the separator plate elements, which opposed edges extend perpendicular to the direction of corrugation of the corrugated region of the particular separator plate element. A first gasket material is disposed in the flattened peripheral seal regions on the coolant facing face of one of the separator plate elements and in the flattened peripheral seal regions on the electrode facing face of the other separator plate element. A second gasket material is disposed in the flattened peripheral seal regions on the opposite faces of the separator plate elements in which the first gasket material is disposed. A filler material is disposed within the corrugations on the coolant facing faces along non-flattened edges of the separator plate elements, whereby a peripheral seal is effected between the separator plate elements by the combination of gasket materials and filler material. Coolant means are provided for introducing a coolant into the coolant chamber. In accordance with a particularly preferred embodiment of this invention, the separator plate elements are constructed of folded metal sheets. Folding of metal sheets to produce the separator plate elements does not stretch the metal, thereby obviating the need for the 50%-elongation required for press forming. Thus, virtually any metal, including corrosion resistant metals, as well as refractories having poor press-forming properties, such as elongation, etc., can be formed by folding to produce the corrugated separator plate elements of the bipolar separator plates of this invention. Yet a further benefit of using a folding method for producing the separator plate elements is that essentially any combination of peak-to-peak distances and depths of valleys or channels is possible.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

In an electrochemical fuel cell stack, the feed gases, fuel (e.g. $H_2$) to the anode electrodes and air or oxygen-containing gas to the cathode electrodes, can be fed to the fuel cell using external gas manifolding in which the gases are delivered to the fuel cell stack from a gas manifold external to the fuel cell stack, internal gas manifolding, in which the fuel gases are delivered from a gas manifold disposed within the fuel cell stack, and combinations thereof. Although either type of manifolding may be employed in accordance with the fuel cell stack and bipolar separator plate of this invention, external manifolding is preferred as it has been shown to be a superior method of distributing the feed gases to fuel cell stacks having more than 50 individual fuel cell units. This advantage is mostly due to the fact that internal gas manifolding manifold hole volumes are limited and as a result, each cell of a 50+cell stack does not obtain the same gas flow. In addition, as the number of fuel cell units in a fuel cell stack using internal gas manifolding increases, the size of the manifolds increases to enable uniform gas flow to each fuel cell unit, thereby becoming a larger percentage of the cell area, which, in turn, results in undesirable increases in cell costs.

When using external feed gas manifolding, a cross-flow arrangement for the gases is preferred for simplicity. Thus, the oxidant gases will flow in a first direction and the fuel gases will flow in a second direction, where the second direction is substantially perpendicular to the first direction. With the appropriate bipolar separator plate design, that is, one in which each side of the separator plate is formed by a separate separator plate element, a space can be provided between the separator plate elements for a cooling medium.

Once the feed gases exit their respective gas manifolds, they are kept separate from each other by bipolar separator sheets/plates disposed between the anode electrode and cathode electrode of adjacent fuel cell units. The bipolar separator plates must be electrically conductive and they may be molded or machined from carbon/graphite composites, press formed from thin sheet or metal, or folded/corrugated from thin sheets of metal. For reasons that will be discussed in more detail herein below, the use of folded metal sheets for producing the bipolar separator plate is preferred.

Figure 1:
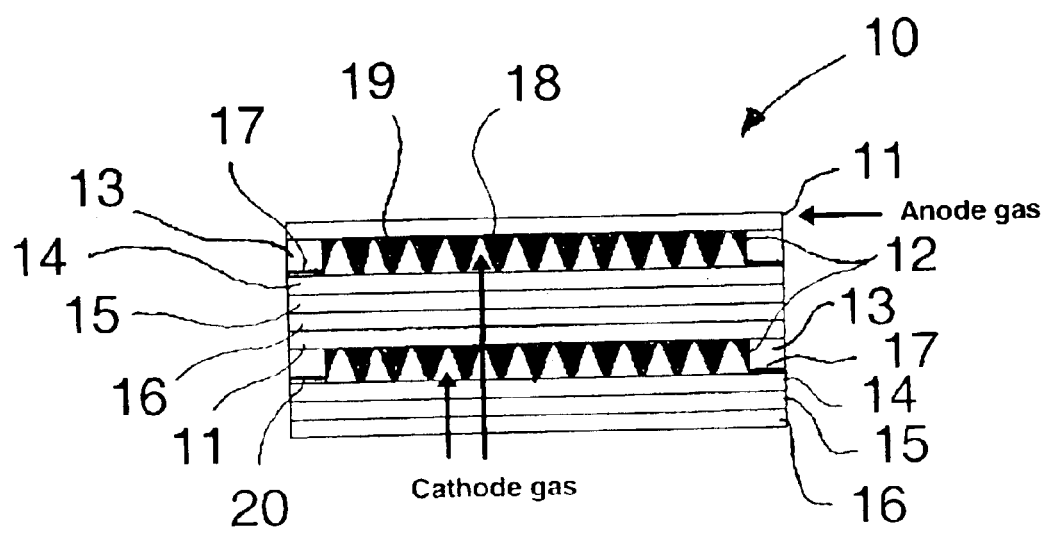
FIG. 1 is a diagram of a lateral view of a portion of a fuel cell stack with separator plates in accordance with one embodiment of this invention.
Figure 2:
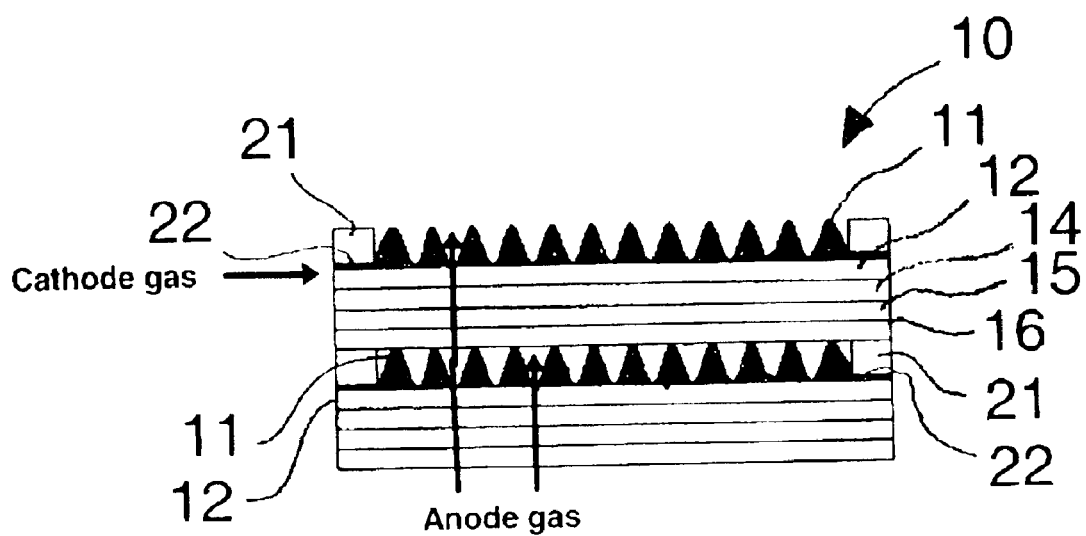
FIG. 2 is a diagram of a lateral view of the portion of the fuel cell stack with separator plates shown in FIG. 1 rotated 90° to the right.
Figure 3:
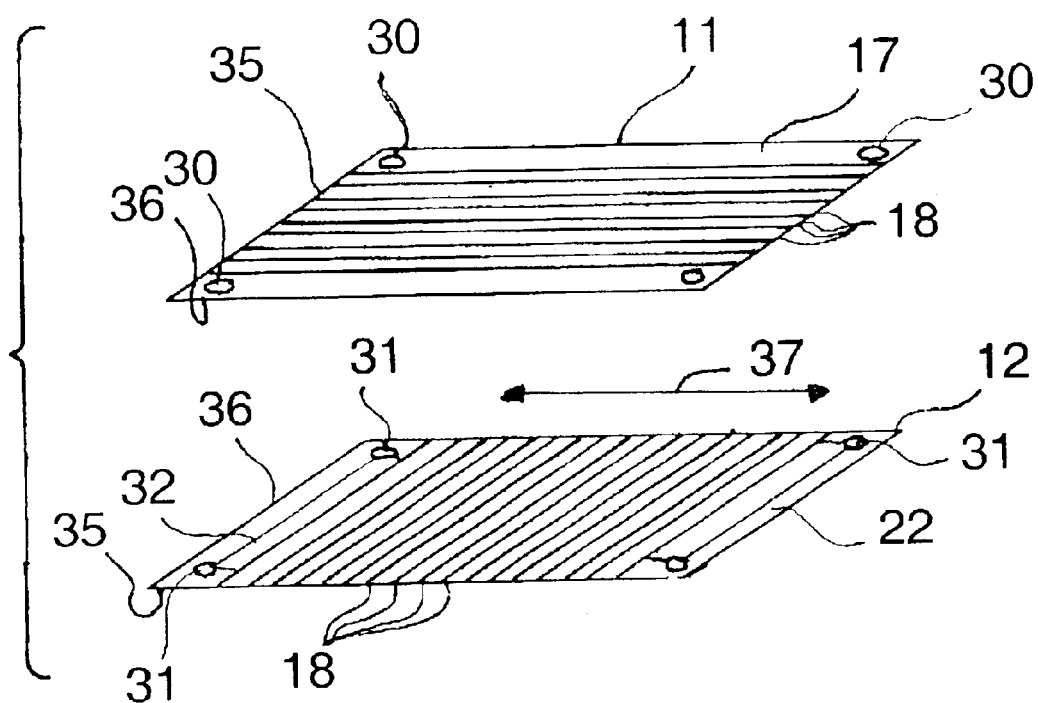
FIG. 3 is an exploded view of a bipolar separator plate in accordance with one embodiment of this invention.
Figure 5:
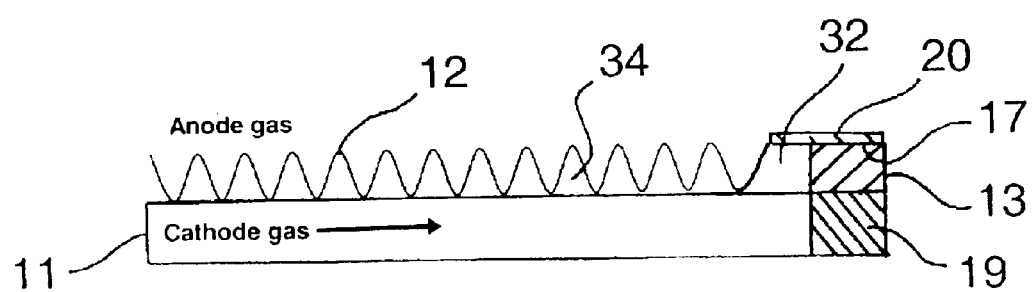
FIG. 5 is a diagram of the separator plate shown in FIG. 4 taken along the line V—V.

FIGS. 1 and 2 show a lateral view of a portion of a fuel cell stack 10 employing a bipolar separator plate in accordance with one embodiment of this invention. As shown, fuel cell stack 10 comprises a plurality of fuel cell units comprising an anode layer 16, a cathode layer 14 and an electrolyte layer 15 disposed between the anode layer 16 and the cathode layer 14. Disposed between the cathode layer 14 of one fuel cell unit and the anode layer 16 of the adjacent fuel cell unit is a bipolar separator plate comprising two joined together, coextensive separator plate elements 11 and 12. Each separator plate element 11, 12 comprises corrugations 18, as shown in FIG. 3, whereby, when joined together, the corrugations of one separator plate element are oriented perpendicular with respect to the corrugations of the other separator plate element. When joined together, separator plate elements 11, 12 form a coolant chamber 34 there between as shown in FIG. 5. Each separator plate element 11, 12 has an electrode facing face 35 and a coolant facing face 36 and comprises two flattened peripheral seal regions 17, 22 extending along opposed edges of the separator plate elements 11, 12. The opposed edges extend perpendicular to the direction of corrugation of the corrugated region 18. The direction of corrugation for separator plate element 12 as shown in FIG. 3 is indicated by arrows 37 and, as can be seen, flattened peripheral seal regions 22 of separator plate element 12 extend perpendicular to the direction represented by arrows 37.

It will be apparent to those skilled in the art that the direction of corrugation also dictates the orientation of the valleys or flow channels 18 formed between the corrugation peaks, which, in turn, dictates the direction of flow of the fuel and oxidant gases. In a fuel cell stack comprising non-square, rectangular fuel cell units and separator plates, the length of the flow channels in one of the separator plate elements 11 will be longer than the flow channel lengths of the other separator plate element 12, as shown in FIG. 3. Because of the differences in flow rates of fuel and oxidant gases flowing through the channels of the anode facing separator plate element and the cathode facing separator plate element, to ensure completeness of the electrochemical reactions, it is preferred, but not required, that the separator plate element having the longer flow channels, separator plate element 11 in FIG. 3, face the anode layer of the fuel cell units and the separator plate element having the shorter flow channels, separator plate element 12, face the cathode layer of the adjacent fuel cell units.

A first gasket material 13, 21 is disposed in the flattened peripheral seal regions 17 on the coolant facing face of one of the separator plate elements 12 and the flattened peripheral seal regions 22 on the electrode facing face of the other separator plate element 11. First gasket material 13, 21 is of sufficient thickness such that, in a fully assembled fuel cell stack 10, the compressed thickness of first gasket material 13, 21 corresponds to the height of the corrugations 18. Suitable materials for use as a first gasket material include Neoprene Foam Tape 4965, which is available from 3M Corporation. A second gasket material 20, preferably in the form of a thin film gasket, is disposed in the flattened peripheral seal regions 17, 22 on the opposite faces of the separator plate elements 11, 12 on which the first gasket material 13, 21 is disposed. Suitable materials for use as a second gasket material include PERMATEX Red RTV available from Loctite Corporation. A filler material 19 is disposed within the corrugations on the coolant facing faces along non-flattened edges of the separator plate elements. The amount of filler material 19 employed is sufficient not only to completely fill the corrugations 18, but also to effect about a 1 inch wide seal between the separator plate elements when assembled into the fuel cell stack. Suitable filler materials include PERMATEX Red RTV. The arrangement of first and second gasket materials as described herein effects a complete peripheral seal between the separator plate elements around the entire periphery of the separator plate. The fuel cell stack further comprises coolant means for introducing a coolant into the coolant chamber 34.

Regarding the shape of the separator plate elements forming the bipolar separator plate in accordance with this invention, the metal used to form the separator plate elements can be machined or etched, either photo or electrochemical, to form the requisite gas channels. For thin metal sheets less than about 0.020 inches thick, the separator plate elements can be formed by pressing in a sheet metal forming die or they can be formed by folding the metal. Because the use of metals as thin as possible is desired for both technical and economic reasons, folding of metal sheets having a thickness of about 0.003 inches is preferred. As previously indicated, the folded metal approach is preferred over using die molds to press and form the desired shapes because press forming of sheet metal requires costly die molds and requires that the metal being pressed have an elongation of greater than about 50%. This latter requirement severely limits the metals available for use in the corrosive environments of polymer electrolyte membrane fuel cells or the higher temperature environments of either molten carbonate fuel cells or solid oxide fuel cells. In addition, the stresses induced during the pressing process must be relieved by a high temperature anneal of the parts. In contrast thereto, folding of the sheet metal does not stretch the metal and, thus, does not require the 50%-elongation needed for press forming. Consequently, essentially any metal can be formed by folding. A further advantage of the folded metal approach is that essentially any combination of peak-to-peak distance and depths of channels is possible. In pressing forming, the depth of the channels is generally limited to less than about ½ the peak-to-peak distance.

Figure 4:
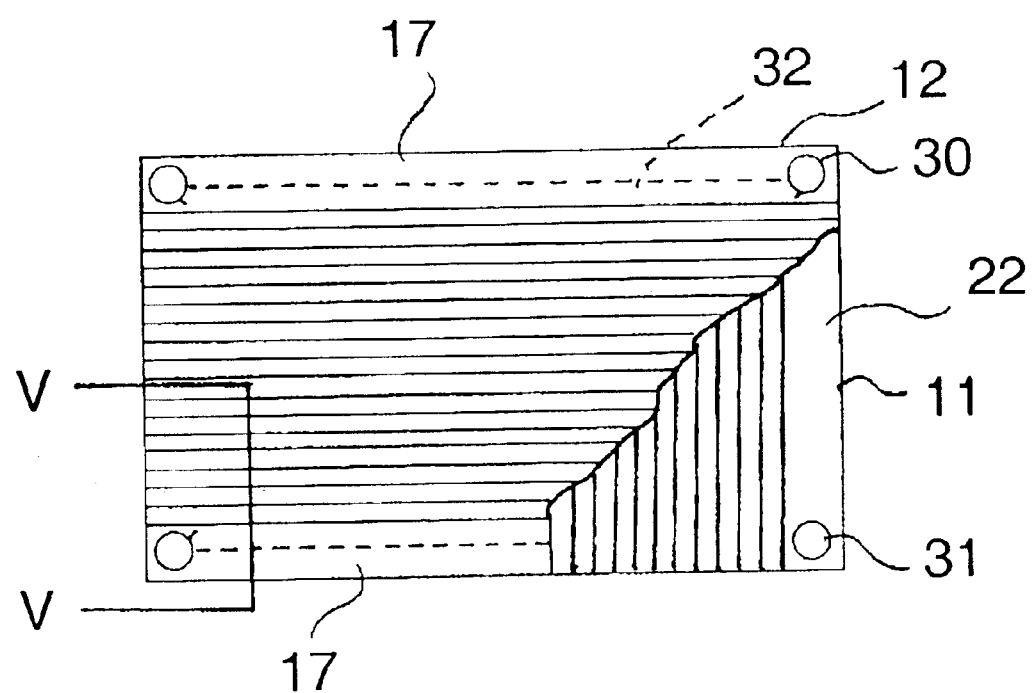
FIG. 4 is a partial cutaway plan view of a separator plate in accordance with one embodiment of this invention.

As will be apparent from the drawings, for example in FIG. 3, flattened peripheral regions 17, 22 overlap to enable peripheral sealing in the corners of the to bipolar separator plate. To provide cooling fluid to coolant chamber 34, flattened peripheral seal regions 17, 22 form in this overlap region aligned perforations 30, 31. Corresponding aligned perforations are also formed by the anode and cathode layers of the fuel cell stack 10, thereby forming an internal coolant manifold for distribution and introduction of a coolant into each coolant chamber 34 disposed between separator plate elements 11, 12 of each bipolar separator plate disposed in the fuel cell stack. As shown in FIGS. 4 and 5, first gasket material 13 forms a channel 32 which is in fluid communication with aligned perforations 30, 31, thereby enabling cooling fluid in the internal coolant manifold to flow into and out of coolant chamber 34 formed between separator plate elements 11, 12. Typically, coolant is introduced into coolant chamber through aligned perforations 30 and exits from coolant chamber 34 through aligned perforations 31.

EXAMPLE

The manufacture, assembly and operation of a bipolar separator plate in accordance with one exemplary embodiment of this invention starts with a thin, flat sheet of metal, having a thickness in the range of about 0.001 to about 0.020 inches, preferably in the range of about 0.001 to about 0.010 inches, which is fed into a set of rotating "gears" so as to fold the metal into the desired shape. Devices for this purpose are well known to those skilled in the art and, thus, will not be discussed in detail herein. The "pitch" is defined as the distance between peaks on one side of the folded separator plate element and "depth" is defined as the distance from the "valley" or "channel" disposed between two peaks to the top of the peaks. For purposes of this exemplary embodiment, a depth of about 0.037 inches, a pitch of about 0.055 inches and a metal thickness of about 0.003 inches are selected. When a flat continuous sheet 12 inches in width is fed into the folding device, a continuous folded sheet having the sinusoidal corrugated design shown in the cross-section of FIG. 5 is obtained. The folded sheet is then cut into 12-inch by 7-inch rectangles and 1-inch wide flat regions pressed into opposed edges disposed perpendicular to the direction of corrugation. ¾-inch round holes are then punched into the flat regions proximate the corners of the corrugated rectangular sheets.

A second continuous role of 7 inch wide sheet metal having a thickness of about 0.003 inches is then fed into a folding machine, resulting in a continuous folded sheet having a sinusoidal corrugated design. As before, the folded sheet is cut into 12-inch by 7-inch rectangles, 1-inch wide flat regions pressed into opposed edges running perpendicular to the direction of corrugation, and holes punched in the corners, which holes, when the two folded and pressed rectangles are assembled to form a bipolar separator plate, are aligned with the holes of the first folded rectangle.

Next, gaskets and seals are applied to the folded rectangles, after which the two folded rectangles are joined together to form the separator plate. Joining of the two folded rectangles may be accomplished by any suitable method. In accordance with one particularly preferred embodiment, the two folded rectangles are joined together by weld seams traversing the corrugated regions of the folded rectangles, which form welds between the separator plate elements within the cooling chamber. As a result, to the extent that the separator plate elements are subjected to corrosion during operation of the fuel cell stack which could result in a weakening of the separator plate, the welds are able to overcome the effects of corrosion and maintain the structural integrity of the separator plate. It will be apparent that, when fully assembled into a fuel cell stack, by virtue of the perpendicular disposition of the corrugations of the separator plate elements, the fuel and oxidant gases fed into the fuel cell stack will flow in perpendicular (cross-flow) directions to each other.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In a fuel cell stack comprising a plurality of substantially planar fuel cell units, each said fuel cell unit comprising an anode layer, a cathode layer and an electrolyte layer disposed there between, and a separator plate having an anode facing surface and a cathode facing surface, said separator plate disposed between said anode layer of one of said fuel cell units and a cathode layer of an adjacent said fuel cell unit, the improvement comprising:

said separator plate comprising two joined together coextensive separator plate elements having perpendicularly disposed corrugated regions and forming a coolant chamber there between, each said separator plate element having an electrode facing face and a coolant facing face and having two flattened peripheral seal regions extending along opposed edges of said separator plate elements, said opposed edges extending perpendicular to a direction of corrugation of said corrugated region;

a first gasket material disposed in said flattened peripheral seal regions on said coolant facing face of one of said separator plate elements and said flattened peripheral seal regions on said electrode facing face of said other said separator plate element;

a second gasket material disposed in said flattened peripheral seal regions on opposite faces of said separator plate elements on which said first gasket material is disposed;

a filler material disposed within said corrugations on said coolant facing faces along non-flattened edges of said separator plate elements, whereby a peripheral seal is effected between said separator plate elements; and coolant means for introducing a coolant into said coolant chamber.

2. A fuel cell stack in accordance with claim 1, wherein said separator plate elements are constructed of folded metal sheets.

3. A fuel cell stack in accordance with claim 1, wherein said separator plate elements are welded together by welds disposed in said coolant chamber.

4. A fuel cell stack in accordance with claim 1, wherein said first gasket material has a compressed thickness corresponding to a height of said corrugations when said fuel cell stack is fully assembled.

5. A fuel cell stack in accordance with claim 1, wherein said separator plate elements are constructed of pressed metal sheets.

6. A fuel cell stack in accordance with claim 1, wherein said second gasket material is a film material.

7. A fuel cell stack in accordance with claim 1, wherein said coolant means comprises a plurality of internal coolant manifolds disposed within said fuel cell stack, each of said internal coolant manifolds in fluid communication with said coolant chamber.

8. A fuel cell stack comprising:

a plurality of substantially planar fuel cell units, each of said fuel cell units comprising an anode layer, a cathode layer and an electrolyte layer disposed there between; and a bipolar separator plate having an anode facing surface and a cathode facing surface, said separator plate disposed between said anode layer of one of said fuel cell units and a cathode layer of an adjacent said fuel cell unit, said bipolar separator plate comprising two joined together coextensive separator plate elements having perpendicularly disposed corrugated regions and forming a coolant chamber there between, each said separator plate element having an electrode facing face and a coolant facing face and having two flattened peripheral seal regions extending along opposed edges of said separator plate elements, said opposed edges extending perpendicular to a direction of corrugation of said corrugated region, a first gasket material disposed in said flattened peripheral seal regions on said coolant facing face of one of said separator plate elements and said flattened peripheral seal regions on said electrode facing face of said other said separator plate element, a second gasket material disposed in said flattened peripheral seal regions on opposite faces of said separator plate elements on which said first gasket material is disposed, a filler material disposed within said corrugations on said coolant facing faces along non-flattened edges of said separator plate elements, whereby a peripheral seal is effected between said separator plate elements, and coolant means for introducing a coolant into said coolant chamber.

9. A fuel cell stack in accordance with claim 8, wherein said fuel cell units are selected from the group of fuel cell types consisting of polymer electrolyte membrane fuel cells, molten carbonate fuel cells, solid oxide fuel cells and phosphoric acid fuel cells.

10. A fuel cell stack in accordance with claim 8, wherein said separator plate elements are constructed of folded metal sheets.

11. A fuel cell stack in accordance with claim 8, wherein said separator plate elements are welded together by welds disposed in said coolant chamber.

12. A fuel cell stack in accordance with claim 8, wherein said first gasket material has a compressed thickness corresponding to a height of said corrugations when said fuel cell stack is fully assembled.

13. A fuel cell stack in accordance with claim 8, wherein said second gasket material is a film material.

14. A fuel cell stack in accordance with claim 8, wherein said coolant means comprises a plurality of internal coolant manifolds disposed within said fuel cell stack, each of said internal coolant manifolds in fluid communication with said coolant chamber.

* * * * *